March 16, 1954      F. W. LEFFER      2,672,407
APPARATUS FOR CONTACTING SUBDIVIDED SOLID PARTICLES
WITH DIFFERENT FLUID STREAMS WITHIN SEPARATE
SUPERIMPOSED CONTACTING ZONES
Filed Feb. 26, 1949
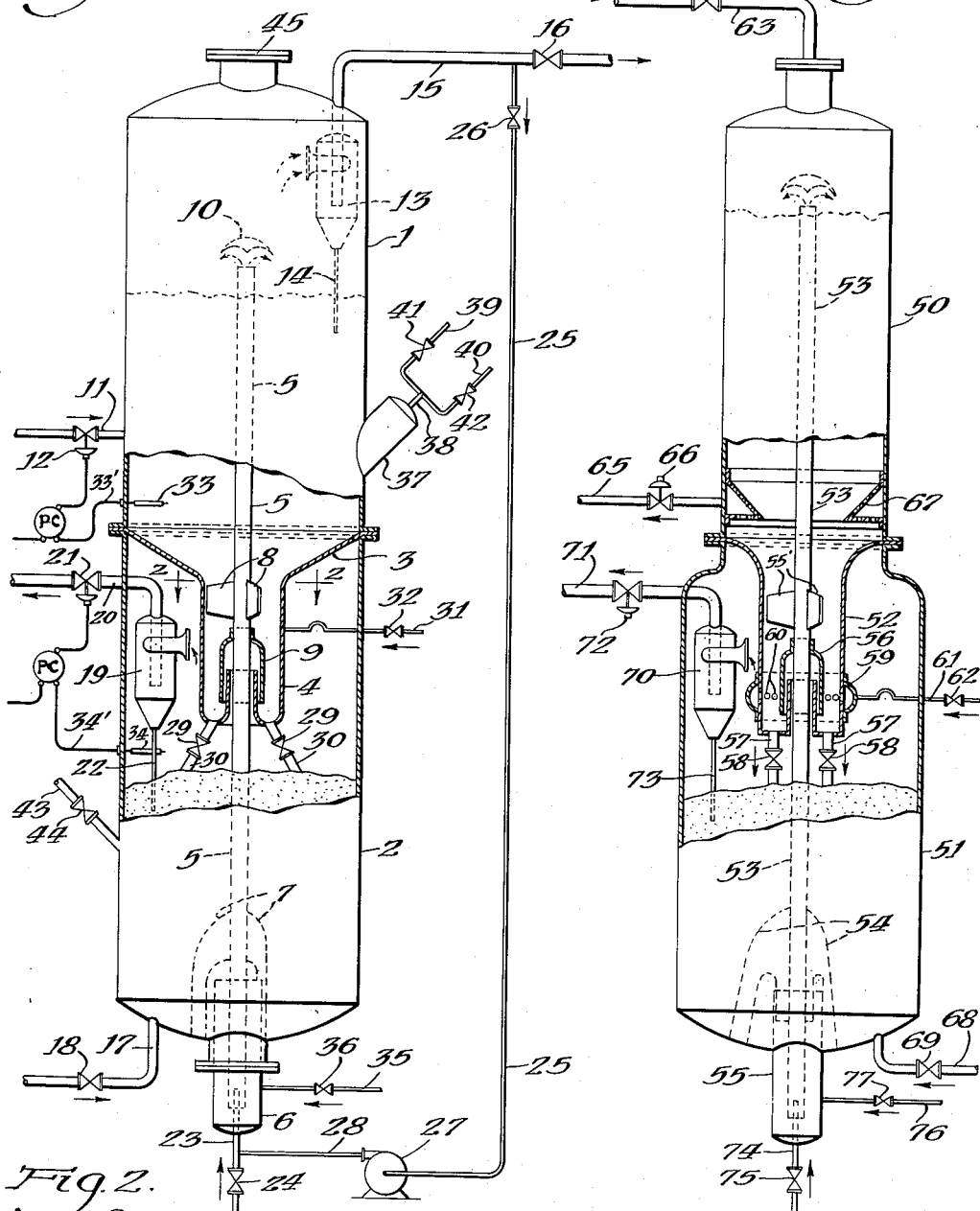
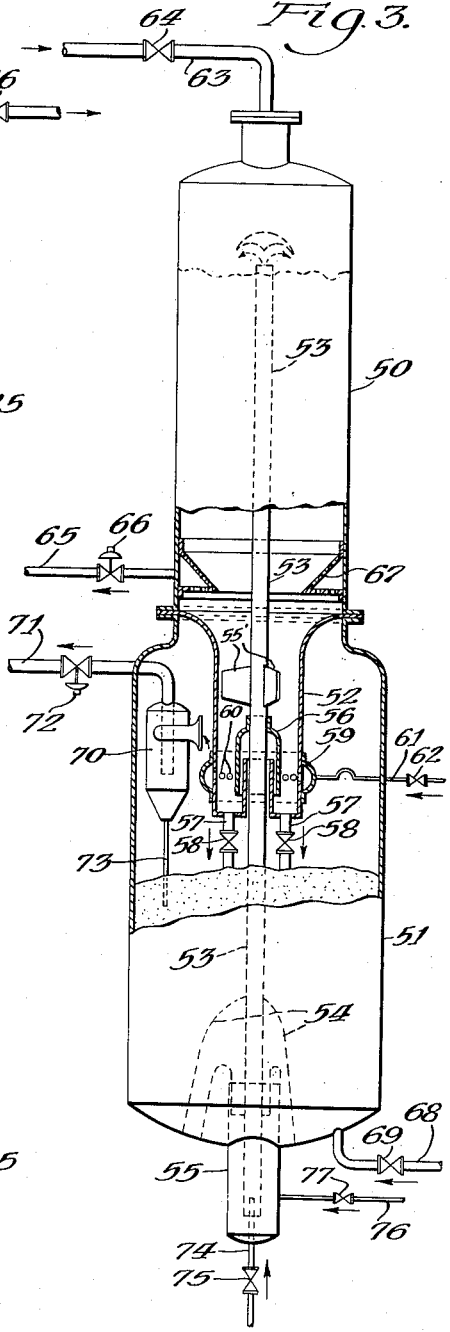
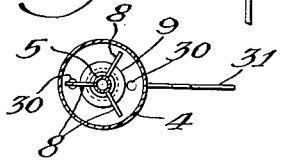
Inventor:
Frederick W. Leffer
M. P. Venema
By Philip T. Liggett
Attorney
Agent Patented Mar. 16, 1954

2,672,407

UNITED STATES PATENT OFFICE 2,672,407

APPARATUS FOR CONTACTING SUBDIVIDED SOLID PARTICLES WITH DIFFERENT FLUID STREAMS WITHIN SEPARATE SUPERIMPOSED CONTACTING ZONES

Frederick W. Leffer, Riverside, Ill., assignor to Universal Oil Products Company, Chicago, Ill., a corporation of Delaware Application February 26, 1949, Serial No. 78,594

2 Claims. (Cl. 23—288)

This invention relates to an improved method and means for contacting sub-divided or particulated solid material with different fluid streams within separated and superimposed contacting zones, and more particularly to an operation wherein the solid material is continuously passed downwardly through each of two superimposed confined contacting zones and through a restricted passage-way therebetween while solid material from the lower portion of the lower contacting zone is recirculated to an elevated portion of the upper contacting zone. The present operation is also particularly concerned with an arrangement having a relatively short passage-way between the superimposed contacting zones for the continuous downward flow of the solid material from the upper into the lower one of these zones.

The present invention provides a method and means for obtaining the desired circulation of the solid material while precluding fluid flow through the solids down-flow passageway from either one of the contacting zones to the other, by providing for the maintenance of substantially balanced pressures within the immediate proximity of the inlet and outlet ends of the downflow passageway with a two-way flow of sealing fluid through the latter and by adjustment of the rate of flow of fluid in proximity of the downflow passageway in response to deviations of the pressure at either of the ends of the passageway from the predetermined pressure balance whereby to maintain a substantially constant relationship between the pressures and assure continuity of the two-way flow of the sealing fluid.

It is a principal object of the present invention to provide an improved operation for a process utilizing two superimposed contacting zones having a continuous cyclic flow of solid material downwardly through each of these zones and from the lower portion of the lower zone to an elevated portion of the upper zone, and insure a free gravity flow of sub-divided solid material from the upper zone to the lower through a restricted passageway with supply of sealing fluid to an intermediate point of the latter without allowing the flow of vaporous or gaseous materials through this passageway from either one of these zones to the other by regulating the pressures in the proximity of the inlet and outlet ends of the passageway so that a substantially constant relationship between these pressures is maintained and the continuity of the two-way flow of sealing fluid from within the restricted passageway to its opposite ends is assured.

It is a specific object of the present invention to insure the free gravity flow of solid material from an upper contacting zone to a lower contacting zone through a restricted passageway while supplying sealing fluid to at least one intermediate point of this passageway and substantially precluding fluid flow therethrough from either one of the contacting zones to the other by regulating the flow of fluid through the upper zone at a selected point in the lower portion of the upper zone and the flow of fluid through the lower zone at a selected point within the upper portion of the lower zone, and adjusting the flow at at least one of the selected points in response to variations between the fluid pressures existing in the immediate proximity of the intake and discharge of the passageway to maintain the pressures substantially equal and to maintain a continuous two-way flow of the sealing fluid from within the restricted passageway to its opposite ends.

It is also an object of the present invention to provide a unitary type of apparatus, suitable for carrying out the improved operation of the present invention, which positions an upper chamber-like contacting section directly above a lower chamber-like contacting section and utilizes a flexible or expansible type of partitioning member between the adjacent contacting sections, such that the partitioning member may expand as necessary for varying temperature conditions. The improved construction also provides an internal up-flow or riser conduit for conveying solid material from the lower portion of the lower section to an elevated portion of the upper section and a relatively short conduit or passageway for transferring solid particles from the lower portion of the upper section to the lower section, in a design or arrangement which eliminates a supporting structure between the contacting zones and also eliminates expansion joints in the up-flow conduit and downflow passageway required for accomplishing the circulation of the solid material in the apparatus.

Additional objects and advantages of the present invention will be noted in connection with the subsequent portions of the specification and reference to the accompanying drawing.

The processing operation and apparatus of the present invention are obviously not limited to any one particular type of use, for many different catalytic, thermal, or non-catalytic operations may be performed in the apparatus, as long as there is embodied the contacting of at least two different fluids with the circulating solid material while substantially precluding the flow of any fluid from either one of the upper and lower chamber sections or contacting zones to the other through the solids downflow passageway. For example, a heat retentive inert solid material may be passed through the apparatus, with one contacting zone being utilized as a heating zone and the other as a conversion or reaction zone, such that a reactant stream may be thermally converted to desired products. The reactant stream may be a hydrocarbon stream to be cracked for the production of lower molecular weight olefinic gases or other desired cracked products, or alternately, it may be low temperature steam to be transformed into superheated steam of high temperature in the order of 2200° F., suitable for use in the gasification of coal dust or other solid hydrocarbonaceous material for the production of synthesis gas. Crushed solid hydrocarbonaceous material such as coal, torbanite or oil shale may also be processed in the unit in conformance with the improved operation to effect a distillation or partial gasification of this solid material and the recovery of desired fluid distillation or conversion products in one of the contacting zones utilized as conversion zone with particulated solid residue being passed through the other contacting zone utilized as combustion or heating zone and with return of at least a portion of resultant heated solid material to the conversion zone in order to mix with and heat the incoming fresh solid charge in the conversion zone. Still further, the method and apparatus are particularly suitable for effecting catalytic operations wherein a subdivided solid catalytic material is utilized in a cyclic operation, with one contacting zone providing a conversion or reaction zone for the catalytic conversion of fluid reactant and the other contacting zone operated as regeneration or reactivation zone for reconditioning of the catalyst.

Briefly, the invention provides in a process wherein particulated solid material is continuously passed downwardly through each of two superimposed and confined contacting zones and a restricted passageway therebetween and is recirculated from the lower portion of the lower contacting zone to an elevated portion of the upper contacting zone while a stream of fluid is contacted with the solid material in the lower zone and a different stream of fluid is contacted with the solid material in the upper zone, the improved method of assuring a free gravitational flow of the solid through the restricted passageway and the substantial preclusion of fluid flow therethrough from either one of the contacting zones to the other, which comprises, regulating the flow of fluid through the upper zone at a selected point within the lower portion of said upper zone, and the flow of fluid through the lower zone at a selected point within the upper portion thereof, introducing a stream of sealing fluid into the restricted passageway at at least one point intermediate its solids intake and discharge sides, and adjusting the flow at at least one of the selected points in response to variations in differential between the fluid pressures existing in the immediate proximity of the intake and discharge sides of the passageway whereby to maintain a substantially constant relationship between the pressures and a continuous flow of the sealing fluid both upwardly and downwardly through the restricted passageway.

In a more specific aspect, the invention provides an improved method of assuring a free gravitational flow of a solid material through the restricted particle passageway and the substantial preclusion of fluid flow therethrough from either one of the contacting zones to the other by regulating the flow of fluid through the upper zone at a selected point within the lower portion thereof and in the proximity of the intake end of the passageway, and the flow of fluid through the lower contacting zone at a selected point within the upper portion thereof and in the proximity of the outlet end of the particle passageway, introducing a stream of sealing fluid into the restricted passageway at at least one point intermediate its solids intake and discharge sides, and adjusting the flow at at least one of the selected points in response to variations between the fluid pressures existing in the immediate proximity of the intake and discharge sides of the passageway whereby to maintain the pressures substantially equal and to maintain a continuous flow of the sealing fluid both upwardly and downwardly through the restricted passageway.

In various previously disclosed forms of processing systems and apparatus, contacting zones have been placed in vertical and superimposed relationships; however, in such instances, it has been customary to control the flow or fluid pressure in at least one of the zones at a point which is away from the particle passageway between the chambers, that is, the pressure indicating apparatus and control means is separated from the passageway by an intervening contacting bed. Such intervening bed tends to damp out or delay the transmission of minor variations in fluid pressure occurring in proximity of the particle downflow passageway, and before such minor variation is recorded and acted upon at the other side of the intervening bed the minor variation frequently has already caused an upset of the previously balanced operation to such an extent that valuable materials are lost and the balanced operation can be restored only after considerable fluctuation and difficulty.

For example, in an operation involving flow of a hydrocarbon reactant through a catalyst bed in the lower contacting zone and upflow of free oxygen-containing regeneration gas through the catalyst bed in the upper contacting zone, a minor diminution in the rate of supply of the regeneration gas to the lower portion of the upper zone tends to result in a delay of the recording of the resultant initially minor variation of fluid pressure in the lower portion of the upper zone by the control instruments responsive to the conditions in the upper portion of the same zone. Within this delay some of the hydrocarbon fluid (in the absence of special preventive measures such as provided by the invention) is liable to gain access from the lower zone through the downflow particle passageway to the lower portion of the upper zone, where it is immediately burnt and causes not only a loss of reactant or reaction product but also an undesired generation of combustion gases which may be just about sufficient to altogether conceal the variation in the regeneration gas supply, thus causing the irregular condition to continue unnoticed for a prolonged time; or the undesired generation of combustion gases may become sufficiently voluminous to cause a further reduction to be made in the regeneration gas supply rate by the operator or by automatic control organs in response to resultant increased gas disengagement from the regenerator bed, thus causing a cumulative deterioration of the operation. Meanwhile, the catalyst in the lower portion of the upper contacting zone experiences undue heating, the portion of the oxygen supply consumed by the burning of hydrocarbon material from the lower zone is no longer available for the desired catalyst regeneration and consequently the conversion reaction in the lower contacting zone is thrown out of balance by the supply thereto of catalyst of increased temperature and decreased activity.

The necessity of avoiding minor variations in operating conditions of the aforesaid kind in order to avoid serious upsets in the operation of systems with circulating comminuted solid has been recognized for some time. To assure balanced operations, one has resorted to the insertion of confined enlarged sealing or stripping zones in the form of separate vessels into the solids cycle between the several contacting zones. The use of such separate vessels, however, increases the mass and total height of the structures required for the support of the contacting chambers and the sealing or stripping vessels therebetween and necessitates an increased bulk of particulated solid in the cycle for a given capacity of the contacting zones, and it also necessitates extensive connecting conduit work which is undesirable from the point of view of resistance to flow, attrition of the particulated solid, and loss of heat from the solid during its flow or transfer from one of the contacting zones to the other. Similar disadvantages are encountered in the use of long hydrostatic legs or standpipes which have been resorted to in previous forms of apparatus arrangements with two superimposed contacting zones in order to insure a high hydrostatic head and a fluidized dense phase transfer of the solid material downwardly from an elevated contacting zone into a contacting zone of lower elevation with intervening riser section between the foot of the standpipe and the lower contacting zone in order to obtain an effective sealing between the fluids in the two contacting zones throughout the operation. It may therefore be seen that it is a particular advantage of the present operation, to measure and control fluid flow at a point immediately responsive to minor variations in the rates of flow of fluid surrounding the downflow particle passageway, namely in the immediate proximity of the intake or outlet of the particle passageway, such that a relatively low differential or substantial equality may be maintained between the pressures at the two end portions of the downflow particle passageway and such that sealing fluid is made to pass from at least one intermediate point of the passageway in both upward and downward direction, thereby permitting a desired gravitational flow of the solid material from the upper contacting zone to the lower while fluid flow through the passageway from either one of the contacting zones to the other is substantially prevented. Thus the invention renders feasible a safe and smooth operation even when using unconventionally short downflow conduits or solids passageways wherein the hydrostatic head of the descending column of solid material is not by itself sufficient to insure a seal between the fluids in the two superimposed contacting zones.

In accordance with the present invention, pressure indicating instruments are necessarily placed each side of the particle passageway, that is, in the lower portion of the upper zone, and in the upper portion of the lower zone, whereby in the event of pressure fluctuations, adjustments may be made to re-establish the identity or low differential of the pressures in the proximity of the inlet and outlet ends of the downflow passageway, that is to say, to re-establish a substantially constant relationship of these pressures. The pressure adjustments may be made manually upon observation of pressure changes in the indicating instruments. Preferably, however, automatically operating pressure control devices are connected to the pressure indicating instruments and to a differential pressure controller. The adjustments made manually or by automatic control apparatus are such that immediately upon a minor diminution of the pressure at the inlet end of the downflow solids passageway, relative to a predetermined desired pressure, the rate of supply of fluid to the lower portion of the upper zone is increased, or alternately, the rate of flow of fluid issuing from the lower portion of the upper zone is decreased, to promptly restore the predetermined pressure relation; or still further, such that on diminution of the pressure at the outlet end of the downflow passageway, relative to the predetermined desired pressure, the flow-rate of the fluid issuing from the upper portion of the lower zone is decreased, or the flow rate of fluid supplied to the upper portion of the lower zone is increased. Converse adjustments are made upon minor increases of the respective pressures, relative to the predetermined desired pressure, so that in all cases the predetermined pressure relation assuring sealing of the fluids in the two contacting zones from each other is promptly reestablished and maintained substantially constant.

While the improved mode of operation may be carried out in systems having a solids upflow return conduit external of the contacting zones, or having a mechanical elevator type of solid particle returning means, a preferred apparatus for operating the conversion system utilizes an internal vertical riser conduit. A preferred embodiment of the unitary apparatus is designed and arranged to eliminate expansion joints in the solids upflow and downflow conduits as well as to place the contacting zones or sections adjacent one another within a continuous chamber or housing, whereby to eliminate the supporting structures between the contacting sections.

Briefly, the improved unitary apparatus comprises in combination, a vertically positioned chamber having an expansible partitioning means across the interior thereof and forming separated upper and lower contacting sections, an open-ended conduit extending from the lower portion of the lower section to an elevated portion of the upper contacting section, the internal open-ended conduit being supported from the lower section and extending slidably through the partitioning means, a fluid inlet to the lower contacting section, another fluid inlet communicating with the lower end of the internal open-ended conduit, an annular passageway for solid material extending through the partitioning means and around the conduit, a fluid outlet to each of the upper and lower contacting sections, and a sealing fluid inlet to the annular passageway.

The fluid inlet to the lower contacting section and the fluid outlets to the upper and lower contacting sections of the unitary apparatus may be arranged to accommodate either upflow of fluid countercurrent to the descending particles, or downflow of fluid concurrent with the descending particles, within either of the contacting zones. One or more fluid inlets are provided at the lower portion of the upper contacting section when the unit is intended for effecting countercurrent contact between fluid and descending particles therein; a fluid inlet may in some cases be provided at the upper portion of this section when it is designed for effecting concurrent contact therein while in some other cases the supply of fluid for concurrent contact in this upper contacting section is accomplished essentially through the inlet communicating with the lower end of the internal open-ended conduit. It may be seen upon reference to the accompanying drawing that various methods of supporting the partitioning member between the upper and lower contacting sections may be used as well as various means for supporting and guiding the internal riser conduit, while additional construction features and advantages of the improved apparatus will also be more apparent upon reference to the drawing and the following description thereof.

Figure 1 of the drawing is an elevational view partially in section, of a unitary apparatus having two contacting zones designed for countercurrent flow operation and separated by a depending partitioning means, and further having a centrally positioned open-ended riser conduit for passing particulated solid material from the lower zone to the upper.

Figure 2 is a sectional plan view through a portion of the partitioning means and the centrally guided open-ended conduit.

Figure 3 of the drawing is an elevational view partially in section, of a unitary apparatus having upper and lower contacting sections, with a depending partitioning means between the contacting sections of a somewhat different design than that of Figure 1, also varies in that the fluid inlet and outlet means to the upper contacting section are arranged such that the fluid stream moves downwardly through the upper section of the column concurrently with descending solid material.

Referring now to Figure 1 of the drawing, there is shown a vertically disposed chamber having an upper section 1 and a lower section 2, with each of these sections being flanged to permit their being joined together and to accommodate a separating or partitioning member 3. The partition 3 has its outer periphery supported from the chamber and hangs in a flexible manner downwardly therefrom, tapering to a smaller cross-sectional area at its lower end and forming a lower well portion 4, which constitutes a particle downflow passageway of substantially smaller cross-section than that of either contacting section and surrounds an open-ended vertical conduit 5.

In this embodiment, the lower head of the lower section 2 has an elongated well-like portion 6 which in turn extends a short distance into the lower portion of the chamber, whereby the solid material from the lower contacting section may be withdrawn therefrom in an annular column, passing downwardly from the lower end of the contacting section through the well and into the lower end of the open-ended conduit 5, which in turn has its lower end extending downwardly into the well-like section 6. The conduit 5 has supporting legs or brackets 7 which are rigidly attached thereto and which rest on the lower portion or head of section 2 and serve to support the open-ended conduit within the chamber. At the partitioning member 3 and the withdrawal well 4, the open-ended conduit extends through the latter in a slidable manner such that differential expansions between the open-ended conduit and the chamber or the partitioning means, may be accommodated. The conduit 5 may have suitable ribs or guide members 8 projecting rigidly outwardly therefrom and bearing against the well portion 4 in order to maintain the conduit 5 aligned within the center of the contacting chamber. A cylindrical baffle or skirt-like member 9 is attached to the conduit 5 within the well 4, such that descending solid particles are channeled or guided away from the sleeve or slip joint between the conduit and the opening provided in the lower end of the well 4. The top of the open-ended conduit 5 terminates within the upper portion of section 1 in a manner suitable to permit the solid material transported upwardly through the conduit to be distributed to the upper portion of contacting section 1. Suitable baffling 10, may, if desired, be utilized to aid in deflecting the solid material downwardly into the contacting bed maintained within the lower portion of the section 1.

The upper contacting section 1 has an inlet port or line 11, which in turn has a control valve 12 suitable to control the rate of introduction of a stream of fluid, such as a gasiform reactant, into the lower portion of the upper chamber for countercurrently contacting the solid material descending through the upper section 1. The contact between the solid particles and the gasiform stream may, if desired, be maintained in a fluidized bed, the gasiform stream causing a hindered settling or fluidizing action on the solid material as the former passes upwardly through the latter, with the amount of fluidization depending upon the size of the particles and the quantity of the gaseous or vaporous stream being introduced into the upper contacting section. On the other hand, the relative rates of flow of gasiform fluids and solid particles may be such that the solid material in section 1 is maintained in a descending compact bed substantially free from fluidization. Within the upper portion of the chamber, there is provided a centrifugal type of particle separating apparatus 13, which is suitable to collect entrained solid material and return it to the contacting bed within the lower portion of the chamber through a return leg or dip leg 14. The gases or vapors resulting from the contact in the upper section of the unit are disengaged from the particle bed therein and are discharged, together with the gasiform fluid from the conduit 5, from the upper portion of the contacting section 1 through the separator 13 and line 15, having control valve 16.

The lower portion of the contacting section 2 has an inlet port or line 17 and control valve 18 such that a gaseous or vaporous stream may be brought into countercurrent contact with a fluidized or compact bed of descending solid material within the lower contacting section as in the upper. Also, as within the upper contacting section, a centrifugal type of particle separating apparatus 19 is indicated as connecting with the product outlet line 20 having control valve 21, such that resulting contacted gases or vapors may be withdrawn from the lower contacting zone substantially free of entrained solid material. Recovered solid particles are returned from the lower portion of the separator 19 by way of dip-leg or return line 22, which extends downwardly into the lower contacting bed of solid material.

The terms "fluidized bed" and "compact bed" as used herein define different and non-equivalent conditions of concentration of the solid material in contact with fluid in the contacting beds; the term "fluidized bed" designates a dense mass of solid particles in the state of hindered settling in a relatively high proportion of fluid such that the bed has the appearance of a boiling liquid wherein the individual solid particles are given more or less freedom for motion in all directions similar to the motion of molecules of a liquid in a boiling body of such liquid, whereas the term "compact bed" designates a mass of solid particles in contact with a relatively low proportion of fluid such that the individual solid particles are impeded by adjoining solid particles from moving to any material extent in all directions and are caused to travel all at substantially the same rate of flow and substantially in the same direction as the rate and direction of flow of the contacting bed.

Projecting inwardly into the lower withdrawal well 6 and the lower end of the open-ended conduit 5, is a line 23, having control valve 24, which is suitable to introduce a transporting gasiform stream into the lower end of the transfer conduit 5, such that solid material is withdrawn continuously from the well 6 and passed in a fluidized stream upwardly through conduit 5 and into the upper contacting section 1. The type of gas or vapor introduced through line 23, as a transporting medium, may vary and will depend upon the conversion operation which is being carried out within the apparatus. For example, where a hydrocarbon conversion operation is being effected within the lower contacting section 2 and a reheating or regenerating operation is applied to the solid particles, within the upper contacting section 1, the stream supplied through line 23 may be an inert gas utilized primarily as transporting fluid; or it may be an air stream, or a stream having a lesser oxygen content than air whereby a controlled oxidation or carbonaceous material is effected within the conduit 5 simultaneously with the transporting of the particulated solid through this conduit to the final regenerating stage in section 1. Flue gas from the upper section 1 may also be advantageously used as a transporting medium in the conduit 5, in which case, flue gas is circulated, preferably in substantially uncooled condition, from line 15 by way of line 25 having control valve 26, the circulating pump 27 and the line 28, which in turn joins with the line 23 entering the lower end of the conduit.

The solid particle flow from section 1 through the annular well or down-flow passageway 4 to the lower section 2, is in this embodiment controlled by suitable valves 29 which are placed in outlets 30 at the lower end of the withdrawal well 4. Preferably the valves 29 have control arm or like means extending through the shell of chamber 7 such that a positive control of the particle downflow may be maintained from outside the chamber.

In accordance with the operation of the present invention, a sealing fluid or gas, at a suitable pressure, is introduced into the well 4 by means of a line 31, having control valve 32, such that with the aid of the pressure balance the sealing fluid is caused to flow continuously both upwardly and downwardly through the well 4 and thereby effectively blankets the fluids within the contacting sections 1 and 2 from each other and positively prevents them from passing through the particle transfer zone or well 4 while the unit is in operation. In addition, a pressure control device PC is connected with valve 12 in the inlet line 11 to the upper contacting section 1 and a pressure sensitive element 33 connects with the interior of the chamber, just above the partition or diaphragm 3 by means of line 33'; this pressure controlling apparatus PC operates so that a desired pressure is maintained within the lower portion of the upper contacting section 1. Similarly, in the lower contacting section 2, a pressure sensitive device 34 connects through line 34' with another pressure control apparatus PC and the latter with control valve 21 in the outlet line 20, so that a suitable desired operating pressure is maintained in the immediate proximity of the particle outlets 30 within the upper portion of the lower contacting section 2 that forms a constant relation to the pressure maintained immediately above the discharge well 4 or the partitioning member 3 by the upper controller connected with inlet valve 12.

This constant relation of pressures preferably is constituted by an equality of the respective pressures. In such case some of the sealing fluid supplied through line 31 will bleed through the outlets 30 and the sleeve arrangement or slip joint 9 into the lower section 1 and the remainder will pass upwardly into the upper section 2. The ascending portion of the sealing fluid may also serve to attain a stripping effect on the descending particles. The sealing fluid, when not required for any substantial stripping action, will be supplied through line 31 at a rate of flow merely sufficient to assure continuous flow in part upwardly and in part downwardly through the transfer well 4. On the other hand, when a more pronounced stripping action is desired within the transfer well 4 it is preferred to maintain a somewhat higher rate of sealing fluid supply and a slightly lower pressure immediately above this well than is maintained in the lower section 2 in the vicinity of the outlets 30 so that the constant pressure relation is constituted by a small differential which is controlled to cause a major portion of the sealing fluid to ascend in the well 4 and a minor portion to descend therethrough, thereby positively precluding any fluid from the lower section 2 to bleed upwardly through this well.

The pressure control arrangement, and the fluid and particle flow control means, permit the free flow of the solid material from the upper to the lower contacting zone while substantially preventing gaseous flow from one chamber section to the other, and in addition, provides a structural advantage, in that any material differential pressure is substantially prevented from acting against the partitioning member 3 which separates the two zones. Thus, the partitioning member 3 need, in general, be designed only for the load of solid material which may be resting thereupon from the upper chamber 1.

It is, of course, not intended to limit the construction or arrangement of the control apparatus to that which has been shown, for as noted hereinabove, hand control means may be utilized to adjust fluid flow to the contacting sections and to maintain a substantially constant relation between the pressures immediately above and below the transfer well 4, or alternately, a differential pressure controller may be connected between the pressure sensitive devices and the control valves 12 and 21 respectively, such that the desired constant relation may be maintained between the pressures each side of the passageway and the partitioning member 3. Sealing fluid may be supplied through line 31 to a lower point of the well 4 than shown in the drawing or to a plurality of horizontally or vertically spaced points of this well.

Various modifications may also be made to the apparatus in order to better accommodate various desired conversion operations, and it is not intended to limit the unitary system of this invention to any one particular operation. A stripping fluid may be introduced to the withdrawal well 6 at the lower end of the contacting section 2, by means of a line 35 having control valve 36. Such a stripping medium may be steam, flue gas or other relatively inert fluid suitable to remove entrained and occluded gaseous or vaporous material from the particles descending from the lower portion of the contacting section. There is also indicated connecting with the lower portion of the upper contacting section 1, a combustion zone 37 which has a burner 38 projecting into it for supplying heat to the lower end of the upper contacting section, whenever it may be necessary to provide part or all of the process heat requirement in this manner to the particles prior to their transfer to the lower contacting section. For example, in a non-catalytic operation wherein substantially inert solid material is circulated through the system, and heat is supplied to the particles in the upper section 1 for an endothermic conversion operation within the lower contacting section 2, fuel and air may be passed to the burner 38 by means of lines 35 and 40, having respectively control valves 41 and 42, to furnish part or all of the heat requirements, the balance—if any—of the heat requirements being furnished by combustion of combustible contaminants from the solid particles in the contacting section 1. The present embodiment of the apparatus also shows a man-hole or access opening 45 at the top of the contacting section 1, suitable to provide means for installing internal apparatus within the unit.

There are various non-catalytic high temperature operations which may be advantageously carried out within the unit of this type. For example, heat retentive inert solid particles of a refractory nature, and capable of withstanding temperatures of from 2000° to 3000° F., may be heated by hot gases furnished from combustion zone 37 and burner 38 (or a plurality of such combustion zones and burners spaced horizontally along the periphery of the section 1), to this upper contacting section 1, the heated particles being transferred by gravitational flow through the transfer well 4 to the lower contacting section 2, wherein a gaseous stream such as steam may be introduced and passed upwardly countercurrently to the particles to become high temperature superheated steam desirable for use in a synthesis process. Alternatively, saturated hydrocarbon vapors may be thermally cracked at a high temperature and for periods of short contact time for conversion of the vapors to desired olefinic compounds, such as ethylene and the like.

In another specific operation, the unit may be advantageously used to produce normally liquid and gaseous hydrocarbon products from oil shale, crushed coal or other solid hydrocarbonaceous material. In such an operation, comminuted oil shale or coal may be introduced, preferably in predried state, to the lower contacting section 2 by way of line 43 having valve 44, and high temperature steam or a hydrocarbon vapor or other desired hot gaseous medium, preferably of a non-oxidizing nature, is introduced through line 17 and control valve 18 whereby to contact the descending solid particles in a countercurrent operation. The contacted solids residue is withdrawn from the lower end of section 2 through the well 6 and transferred, preferably with the aid of a substantially uncooled portion of the flue gases from line 15 resulting in such operation, upwardly to the upper contacting section 1 wherein residual carbonaceous matter may be burned from the descending bed of material, by means of an oxygen-containing gas introduced through line 11 and control valve 12, while at the same time, the temperature of the residual particles is elevated to a high temperature and a regulated portion of the highly heated burnt residue is permitted to flow by gravity downwardly through the well 4, valves 29, and outlets 30 into the lower contacting section 2, whereby the thus recirculated solid material acts as a heat-carrying medium and spacing agent materially aiding the endothermic distillation of the oil shale or other hydrocarbonaceous solid charge being continuously introduced to the lower section through line 33. In such operation, another portion of the particulated burnt solid residue is withdrawn from the lower portion of the upper section 1 through a suitable valved outlet (not shown in the drawing) and may be passed to a quenching or cooling device for the generation of steam or other gasiform heating medium for this operation.

Those familiar with the processing arts will be aware of the advantages of the present operation and of the unitary apparatus for other types of processing operation which have not been specifically mentioned hereinabove, but may be of considerable importance and of high commercial value in moving compact bed or fluidized bed types of particle and gas contacting systems. For example, the method and apparatus of this invention may be applied to the contact operations described in the Patent No. 2,459,824 issued January 25, 1949, on my prior application Serial No. 706,914 filed October 31, 1946. In a typical one of such contact operations, gasoline may be produced by the catalytic cracking of heavier hydrocarbon oils. A mass of refractory cracking catalyst is maintained in circulation through the upper and lower contacting zones 1 and 2, the restricted downflow transfer passageway 4, and the vertical riser conduit 5. A stream of the oil to be cracked is introduced through line 17 and valve 18 to the lower portion of the conversion section 2 wherein it is maintained in substantially vaporous phase in contact with a fluidized bed of the cracking catalyst which is supplied from the transfer well 4 in regenerated state at a sufficient temperature and in sufficient quantity to effect the cracking reaction in the fluidized bed. The vaporous and gaseous cracked products disengaging from the fluidized bed are removed from section 2 through the particle separator 19, line 20 and pressure-balancing control valve 21 to a suitable fractionation system for recovery of the cracked gasoline and by-products. Contaminated catalyst descends through the lower well 6 to the inlet of the riser conduit 5 where it is picked up by a hot gas stream recirculated through line 25, pump or blower 27, line 28, and line 23 in a sufficient amount to transfer the catalyst at the desired circulation rate to the top of the bed in the upper or catalyst regenerating section 1. Air is supplied through line 11 and the pressure-balancing control valve 12 to the lower portion of the catalyst bed in section 1 at a rate maintaining the bed therein in fluidized state and substantially burning combustible contaminants from the particles in the descending bed while maintaining the latter at proper temperature. The regenerated catalyst is stripped of occluded or entrained air and combustion gases in the bottom portion of section 1 and in the transfer well 4 with the aid of steam supplied thereto as sealing and stripping medium. The gases disengaging from the bed in section 1 commingled with the used transfer gas discharged from conduit 5 and the resultant gas mixture is withdrawn through particle separator 13 and line 15, and is discharged, to the extent not desired as transfer gas in conduit 5, through the pressure control valve 16 from the system.

Figure 2 of the drawing shows, in plan view, the relation of the transfer well 4, the partitioning member 3, the internal conduit 5, and the spacer or guide plates 8, which are attached radially to the conduit and permit particulated solid material to pass downwardly through the well or transfer zone 4 to the lower contacting section 2 without blocking the passageway. In this embodiment as illustrated, three spacers or guide plates 8 are indicated around the conduit 5, with at least three being necessary to properly guide the member 5, within the well and to maintain it in a central position within the contacting unit. The outer ends of the ribs 8 are in a sliding contact with the inner wall of the well or passageway 4. As noted hereinabove, the central riser conduit 5 is supported from the lower end of the chamber and is not rigidly connected with any portion of the transfer well 4; thus, the conduit 5 is allowed to expand freely upwardly through the well and partitioning means, as may be necessary for high temperature conditions. The supporting legs or brackets 7 may be spaced, at least three in number, in a manner similar to the spacing of the guide plates 8. The brackets 7 or the guide plates 8 or both may be extended vertically upwardly along the portions of the conduit 5 within the downwardly moving beds in sections 2 and 1, respectively, thereby forming vertical fins which stabilize the conduit 5 against bending and lateral vibration and aid in heat transfer between the materials within and around the conduit.

Referring now to Figure 3 of the drawing, there is shown a somewhat different embodiment of the improved unitary apparatus, having an upper contacting section 50, a lower contacting section 51 and a depending partitioning member 52, which serves to separate the two contacting sections as well as form a well-like passageway for passing solid particle material from the upper section to the lower. As in Figure 1 of the drawing, the upper and lower sections 50 and 51 are preferably made of two flanged sections suitable to be bolted together at their juncture and form a single unitary chamber, the partitioning member 52 being supported between the flanged portions of the chamber. Partitioning member 52 flares downwardly and inwardly to form a lower well-like portion; its depending arrangement and construction permits it to be flexible and expansible under varying temperature conditions and renders it suitable to support the load of solid particles in the upper contacting section 50. An open-ended conduit 53 extends from the lower portion of the lower contacting section to the upper portion of the upper section and is supported by suitable legs or vertical rib members 54, which bear against the lower head of the lower section 51 and, in this embodiment, also have vertical rib-like guide portions which extend inwardly into the well 55 that serves to withdraw solid particle material from the lower portion of section 51. Additional vertical ribs or guide members 55' are attached radially to the conduit 53 within the well-like portion of the partitioning member 52, in order to serve as guide members for maintaining the conduit centrally within the unit. Either one or both of the sets of rib-like members may be extended vertically upwardly along the riser conduit 53 in a manner analogous to that described with reference to the conduit 5 of Figure 1.

Also, as in Figure 1 of the drawing, the open-ended conduit 53 passes upwardly through the lower portion of the partitioning means 52 in a slidable manner with a cylindrical skirt or baffle member 56 attached to the conduit so as to slide downwardly over an upturned wall-like portion of the lower end of the member 52. This baffling arrangement permits the downward travel of the solid particles through the passageway and into outlet conduits 57, having valves 58, while substantially preventing such material from entering the slip joint between the two members. A sealing gas distributing header is provided by the ring-like member 59 which circumscribes the well or passageway portion of 52, and holes or perforations 60 therein permit the introduction of a gaseous medium into the passageway. A suitable sealing medium at a controlled pressure is introduced into the header 59 by means of a line 61 having control valve 62, and serves to substantially prevent the passage of vapors or gases from either of the lower or upper contacting sections into the other.

The embodiment of Figure 3 has an inlet line 63 and control valve 64, connecting with the upper section 50 in a flanged joint at the top of the chamber, while a gas or vapor outlet port is provided at the lower end of the contacting section 50 by means of line 65 having control valve 66. A screened or baffled particle and gas separating means 67 is also provided at the lower end of the upper contacting section such that desired product gases or vapors may be withdrawn through the line 65 after passing downwardly through the upper zone 50 in a concurrent movement with the solid particles being discharged from the upper end of the open-ended conduit 53. It may thus be seen from the description of Figures 1 and 3 that the improved unitary apparatus is readily adapted to either countercurrent or concurrent flow between fluid reactant and solid particle streams, or that, in operations involving a conversion in one contacting zone and reconditioning of the solid material in the other contacting zone, the conversion zone may be placed either in the upper or the lower contacting section of the unit.

The lower contacting section 51 of Figure 3 has an inlet port or line 68 and control valve 69, which permits introducing a reactant stream into the lower end of the section, whereby a countercurrent contact may be made with the solid material supplied from the passageway 52 through outlet lines 57 to the upper portion of the lower contacting zone and descending through the latter. Resulting gases and vapors with entrained finely divided material are passed through a particle separator 70 and the gaseous stream substantially freed of particles is discharged through line 71, having control valve 72, while recovered solid material is passed from the lower end of the separator 70 through a return leg or dip-leg 73. Resulting contacted solid material is passed from the lower end of the lower contacting section 51 through the annular passageway provided by well 55 and the internal riser conduit 53, and then enters the lower end of the conduit 53 to be transferred in a fluidized stream of reduced density. A suitable transporting gas or vapor may be introduced into the lower end of the open-ended conduit by means of line 74, having control valve 75, such that a positive upward flow of particles in a reduced or lower density stream may be assured. Where it is desirable to strip the solid particles prior to their transfer through the riser conduit into the upper contacting section 50, a suitable stripping medium of steam, flue gas, or other relatively inert medium may be introduced into the well 55 by means of a line 76 having control valve 77.

The unitary apparatus of Figure 3 may be particularly advantageous for conversion operations utilizing a sub-divided catalytic material which may be transferred in a fluidized manner, and contacted in a compact bed with a fluid reactant in the upper section 50 and in either a compact bed or a fluidized dense phase bed with a catalyst regenerating fluid within the lower contacting section 51 of the unit. This particular embodiment is further advantageously employed, wherein the upper section 50 is a conversion zone, and the catalytic material is to be contacted either with a single reactant stream supplied through line 74, or with two reactant streams separately supplied, respectively, through lines 74 and 63. Alternatively, a reactant stream and a diluent stream may be brought into contact with the catalytic material upon its reconditioning in the lower contacting section 51. For example, a reactant stream may be introduced through line 74 at the lower end of the riser conduit 53 and therein be subjected to an initial contact reaction while transferring the finely divided and freshly regenerated catalytic material to the upper contacting section 50, while a diluent stream may be introduced by way of the upper line 63 to the upper section whereby further conversion of the reactant stream is carried out in a downward concurrent movement of the catalyst and gasiform materials in the presence of the diluent stream. Conversely, a diluent stream may be supplied through line 74 and effect the catalyst transfer through the riser conduit, to be thereafter commingled with a reactant stream supplied through line 64, the commingled fluids thereafter passing downwardly through the section 50 in contact with the descending catalyst bed therein.

In one specific mode of operation, the apparatus of Figure 3 may be used to advantage to provide a high grade gasoline in the catalytic cracking of a hydrocarbon oil stream. A fresh heavy hydrocarbon oil charge stream is introduced at the top of the unit by way of line 63 and subjected to catalytic cracking in section 50, and a resulting gasoline or gas oil fraction separated by fractionation from the products from line 65 is introduced at the lower end of the unit through line 74 such that this fraction is subjected, respectively, to reforming or re-cracking in contact with freshly regenerated catalyst in the riser conduit 53 at a higher temperature than the average cracking temperature prevailing in the bed in section 50, whereby to upgrade the resulting product stream which may be withdrawn from the lower end of the contacting section 50 by way of line 65.

In another specific mode of operation, directed to the treatment of hydrocarbons with a dehydrogenation catalyst which is most effective in a state of lower oxidation than that attained in its regeneration with oxidizing gas, such as for example a composite catalyst comprising alumina and chromium sesquioxide, a descending bed of the contaminated catalyst is countercurrently contacted with an oxygen-containing regenerating gas in the lower contacting section 51 wherein carbonaceous contaminants are burnt substantially from the catalyst particles the hot oxidized catalyst is passed downwardly through the well 55 and is then transferred by a gas of high free hydrogen content, supplied by way of line 74, through the conduit 53 and therein is brought to the lower state of oxidation by the action of the hydrogen thereon, the thus reactivated catalyst is brought into contact with the hydrocarbon reactant stream introduced through line 63 to the conversion section 50 wherein the hydrocarbon material and the gases discharged from conduit 53 pass downwardly at the proper reaction temperature concurrently with and through the descending compact bed, the gasiform reaction mixture is withdrawn through line 65, and contaminated catalyst is passed by gravity through the transfer well 52 and outlet lines 57 to the bed in the lower contacting section 51 thereby completing the catalyst cycle. In this operation the hydrocarbon charge may be, for example, a low-molecular aliphatic hydrocarbon to be dehydrogenated, such as a butane to be dehydrogenated into the corresponding butylene, or a butane—or butylene—containing charge for the production of butadiene therefrom, or it may be an aliphatic hydrocarbon of from 6 to 12 carbon atoms per molecule to be converted into cyclic hydrocarbons with the aid of the dehydrogenation catalyst, or it may be a gasoline fraction to be catalytically reformed for the improvement of its motor fuel characteristics, notably its antiknock value, and particularly in the latter case, additional hydrogen gas in excess of that required for the transfer of catalyst through the riser conduit 53 may be supplied through line 63, if so desired. In this dehydrogenation-reforming or hydroforming operation the desired reaction temperature may be maintained in contacting section 50 by the catalyst and the transfer gas, the latter being supplied to line 74 at such a temperature that it will lower the temperature of the heated catalyst issuing from the contacting section 51 to the desired extent and become heated to practically the same temperature as that desired for the catalyst at the point of discharge from conduit 53.

As in Figure 1 of the drawing, the valve 66 in the outlet line 65, and the valve 72 in the outlet line 71 are each adjustable control valves which may be suitably adjusted by manual or automatic control to maintain the substantially constant relation of equality or small differential between the pressures each side of the paritioning means in a manner analogous to that described above with reference to Figure 1 and thus substantially preclude the transfer of gases or vapors through the transfer well 52 from one contacting zone to the other, while the continuous gravitational transfer of solid material is made downwardly from the upper zone to the lower through the passageway and the outlets 57 with control valves 58. Preferably, suitable automatic pressure control means is connected to each of the valves as well as the adjoining contacting zones on each side of the partitioning member in immediate proximity of the latter such that the substantially constant pressure relation may be maintained within the unit.

The flow control for the establishment and maintenance of the substantially constant pressure relation provided by the invention will ordinarily be supplemented by or coordinated with conventional pressure, flow and temperature measuring and controlling means to assure proper functioning and coordination of all elements of the system. It will be apparent from the foregoing description that the upper and lower contacting zones are operated in all of the various embodiments, broadly speaking, at substantially equal pressures and that the pressure control in the immediate proximity of the solids downflow passageway is primarily designed, not for controlling the general pressure level of the operation, but for rapidly and effectively smoothing out any variations in the rate of flow of fluids anywhere in the system which otherwise would tend to throw the operation off balance. The general pressure level within the system may be regulated by suitable manual or automatic devices in the outlet conduit 15 or subsequent equipment (not illustrated) communicating therewith, in the case of the unit according to Figure 1. For example, the valve 16 may be provided in the form of a conventional automatic pressure regulating valve. In the case of the unit according to Figure 2, the valve 66 in line 65 may be used for controlling the general pressure level within the unit, and in this case the valve 72 in the outlet or inlet line 71, as the case may be, will serve the purpose of establishing the substantially constant pressure relation around the transfer well 52 such that for any pressure change brought about by means of valve 66 or by any other variation in the system the valve 72 is actuated to promptly restore and maintain the equality or low differential between the pressures on the inlet side and outlet side of the transfer well 52.

While the use of conventional valves has been indicated diagrammatically by the reference numbers 29 and 58 in the outlets, 30 and 58 respectively, it is to be understood that these valves may be either in the form of slide valves, cone-shaped plug valves or any other suitable flow control means.

It is also within the scope of the present invention to provide modified embodiments of the unitary apparatus. For example, either of the apparatus of Figures 1 and 3 may be provided with a lower contacting section of either the same diameter as, or of smaller or larger diameter than the upper section. The lower contacting section 2 of Figure 1 may be provided with a fluid inlet at the upper end and with a fluid outlet at the lower end thereof, such that a concurrent flow of the particulated solid material and a reactant stream may be maintained within the lower contacting section. The upper contacting section 1 may be made of a type suitable to maintain a countercurrent contact between the solid material and a reconditioning gas stream in a fluidized dense phase bed of substantially greater height than that of the bed in the lower contacting section 2 while maintaining the latter bed in either a compact form or in a dense fluidized phase for conversion reactions at high temperatures and short contact times, such as are required for example in the pyrolytic conversion of a hydrocarbon charge into olefinic or acetylenic gases. The arrangement of a relatively wide upper contacting section for fluidized dense phase catalyst regeneration and a more narrow lower contacting section for compact bed operation with concurrent flow of the reactant stream and the descending catalyst bed is particularly suitable for effecting a catalytic reforming of gasoline fractions within the lower contacting section 2.

In still another arrangement, desirable for certain conversion operations, the fluid inlet and fluid outlet to the contacting zone 51 of Figure 3 may be reversed such that a concurrent flow of solid material and gasiform streams is maintained within both the upper and lower contacting sections, with suitable replacement of the particle separating device 70 to permit withdrawal of the gasiform products from the lower portion of the section 51, followed by separation of entrained solid material therefrom. However, in all of the various arrangements, the partitioning means and pressure controlling operation are principally the same and as hereinbefore defined, so that the gravitational flow or passage of the particulated solid material downwardly through the solids downflow passageway is maintained while precluding the flow of gases or vapors therethrough from either one of the contacting zones to the other. Also, in each case, the central riser conduit is supported from the lower end of the unit and guided as it passes slidably through the partitioning means such that expansion joints are eliminated and the linear and radial expansions within the various members are accommodated without placing undue deformation or temperature strain on any of the various members of the unit. It is to be understood that the improved pressure controlling operation and the apparatus of the invention are not intended to be limited either to any one particular conversion operation or to only those specifically mentioned in the foregoing specification.

I claim as my invention:

1. A unitary apparatus for contacting subdivided solid material with at least two fluid streams which comprises in combination, a vertically positioned chamber having partitioning means depending from the vertical wall of said chamber and dividing the interior thereof into upper and lower contacting sections, an open-ended conduit extending from the lower portion of said lower section to an elevated portion of said upper contacting section, a transporting fluid inlet communicating with the lower end of said open-ended conduit and directed vertically upward into said conduit, a separate fluid inlet to said lower contacting section, said partitioning means comprising a downwardly extending circular wall spaced from and surrounding said conduit and forming an annular passageway for solid material around said conduit, said partitioning means further comprising an inner wall in close proximity to said conduit and a wall connecting the bottom of said downwardly extending wall and said inner wall and closing the bottom of said annular passageway, a baffle plate depending from said conduit within said annular passageway and overhanging said inner wall of the partitioning means to deflect solid material from the space between said conduit and said inner wall, a fluid outlet from each of said upper and lower contacting sections, and a sealing fluid inlet to said annular passageway.

2. A unitary apparatus for contacting subdivided solid material with at least two fluid streams which comprises in combination, a vertically positioned chamber, partitioning means peripherally attached to the vertical chamber wall and dividing the interior of said chamber into upper and lower contacting sections, an open-ended conduit extending from the lower portion of said lower section to an elevated portion of said upper section, said conduit being supported from said lower section and extending through and spaced from said partitioning means, the latter means comprising a depending wall defining together with an opposite portion of said conduit an annular passageway for the flow of solid material from the upper to the lower contacting section, a vertical baffle laterally spaced around said conduit and having one end sealed to the wall of the latter, said partitioning means further comprising a vertical sleeve slidably engaging said baffle and a wall connecting the bottom of said depending wall and said sleeve, a fluid inlet to the lower contacting section, another fluid inlet communicating with the lower end of said conduit, a fluid outlet from each of said contacting sections, and sealing fluid supply means at said depending wall of the partitioning means.

FREDERICK W. LEFFER.

References Cited in the file of this patent

UNITED STATES PATENTS

| Number | Name | Date |
|---|---|---|
| 2,351,214 | Kaufmann et al. | June 13, 1944 |
| 2,427,341 | Alther | Sept. 16, 1947 |
| 2,440,475 | Jacomini | Apr. 27, 1948 |
| 2,459,824 | Leffer | Jan. 25, 1949 |
| 2,493,672 | Johnson | Jan. 3, 1950 |
| 2,499,305 | Fahnestock | Feb. 28, 1950 |
| 2,517,042 | Skelly | Aug. 1, 1950 |
| 2,539,263 | Munday | Jan. 23, 1951 |